UNITED STATES PATENT OFFICE 2,461,554

AROMATIC FLUOROCARBON

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,380

1 Claim. (Cl. 260—650)

This invention relates to a novel six-carbon-atom aromatic fluorocarbon. To our knowledge, this invention represents the first synthesis or isolation and identification of a compound containing only carbon and fluorine in addition to possessing an aromatic structure. Previous investigators have prepared compounds composed of only carbon and fluorine; however, in no instance have such compounds possessed an aromatic structure.

The novel fluorocarbon, of aromatic structure and containing six carbon atoms and six fluorine atoms, is a non-flammable liquid boiling somewhat below the boiling point of water. This compound, due to its aromatic structure, and especially because it is composed solely of carbon and fluorine, is very stable to most materials. Because of the compound's unique structure and its stability, it has many important applications. The compound is useful as a special solvent, a heat transfer fluid, an insulating material in electrical equipment, and in many other ways.

We have now prepared this novel fluorocarbon and have determined several of its physical constants whereby it may be identified. Its preparation may be accomplished, for example, by the treatment of an appropriate halogenated cyclic compound, e. g., hexachlorobenzene, with a fluorinating agent, bromine trifluoride, as the first step in the process. The organic fluorine-containing material from this reaction is then treated with antimony pentafluoride. Subsequent dehalogenation of the product from the reaction with antimony pentafluoride is accomplished by means of a suitable dehalogenating agent, such as zinc dust, to yield the perfluoro aromatic compound.

The following example illustrates one method for the preparation of this new compound and is in no way to be construed as limiting the invention thereto.

Five hundred and fifty-eight grams of bromine trifluoride was placed in a nickel tube 5.2 centimeters in diameter and 50 centimeters in length, closed at one end and cooled to zero degrees centigrade. Hexachlorobenzene was added thereto at a rate of about 100 grams per hour with continuous stirring by means of a motor-driven nickel rod, inserted through the open top of the tube and fitted with four blades, two inches apart on the rod. After each 100 gram quantity of hexachlorobenzene had been added, the tube was heated to 85 degrees centigrade, maintained at this temperature for a short time, e. g., ten to thirty minutes, and then cooled to zero degrees centigrade. This prevented the accumulation and possible subsequent explosion and pyrolysis of unreacted starting materials. A total of 400 grams of hexachlorobenzene was charged to the reactor; the final ratio being approximately three moles of bromine trifluoride to one mole of hexachlorobenzene. The entire reaction mixture was then heated at 100 degrees centigrade for four hours, after which any excess bromine trifluoride was destroyed by the addition of cracked ice.

A liquid fluorochloro compound was used to dissolve the solid organic reaction product and the resulting solution was heated in a two-liter flask to 60 degrees centigrade with stirring. Over the course of three hours 500 grams (2.3 moles) of antimony pentafluoride was added dropwise thereto. The reaction mixture was then heated to 120 degrees centigrade and maintained at this temperature for a period of about eight hours, during which time bromine and part of the solvent were evolved from the reaction mixture. The product in solution was then washed with hot concentrated hydrochloric acid to remove antimony salts.

After removal of the solvent, the solid product was dissolved in 500 milliliters of absolute ethanol. This solution was added over a six hour period to a refluxing suspension of 500 grams of zinc dust in ethanol. By elevation of the temperature, the more volatile products were distilled from the mixture with some alcohol. The higher boiling constituents were removed by steam distillation. Alcohol was extracted from the accumulated products by washing with water. The crude organic product was rectified in a 100-plate Podbielniak column and yielded a six-carbon-atom aromatic fluorocarbon, which boils from about 81.0 to 82.0 degrees centigrade at 743 millimeters of mercury pressure absolute. The compound has a refractive index of 1.3760 at 20 degrees centigrade, a density of 1.612 grams per milliliter at 25 degrees centigrade, and a freezing point between −11 and −13 degrees centigrade.

It is to be noted that an efficient dehalogenation process and technique are essential for the production of this compound in good yields by the method herein disclosed.

We claim:

An aromatic fluorocarbon, containing six carbon atoms and six fluorine atoms, having a boiling point from about 81.0 to 82.0 degrees centigrade at 743 millimeters of mercury pressure absolute, a freezing point from about −11 to −13 degrees centigrade, a refractive index of about 1.3760 at 20 degrees centigrade and a density of about 1.612 grams per milliliter at 25 degrees centigrade.

WALDO B. LIGETT.
EARL T. McBEE.
VINCENT V. LINDGREN.

REFERENCES CITED

The following references are of record in the file of this patent:

Beilstein, "Handbuch der Organischen Chemie," 4th ed. (1922), vol. V, pages 205–206; 215; 230.

Swarts, "Bull. Soc. Chim. Belg." vol. 42, pages 114–118 (1933).

Henne, "Chemical Abstracts," vol. 27, page 5052 (1933), abstracting the above Swarts article.